US006813317B2

(12) United States Patent
Ishida et al.

(10) Patent No.: US 6,813,317 B2
(45) Date of Patent: Nov. 2, 2004

(54) MULTICARRIER TRANSMITTING METHOD AND MULTICARRIER TRANSMITTER CIRCUIT

(75) Inventors: Kaoru Ishida, Shijonawate (JP); Shin'ichi Kugou, Yokosuka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 675 days.

(21) Appl. No.: 09/732,913

(22) Filed: Dec. 11, 2000

(65) Prior Publication Data

US 2001/0005401 A1 Jun. 28, 2001

(30) Foreign Application Priority Data

Dec. 14, 1999 (JP) .............................. 11-354330

(51) Int. Cl.[7] .............................................. H04L 27/28
(52) U.S. Cl. ..................................................... 375/260
(58) Field of Search ................................. 375/260, 261, 375/264, 267, 296; 370/480–497; 455/127.1, 118

(56) References Cited

U.S. PATENT DOCUMENTS

| | | | | |
|---|---|---|---|---|
| 5,170,413 A | * | 12/1992 | Hess et al. | 375/260 |
| 5,422,913 A | * | 6/1995 | Wilkinson | 375/347 |
| 5,490,172 A | | 2/1996 | Komara | |
| 5,504,783 A | * | 4/1996 | Tomisato et al. | 375/267 |
| 5,790,555 A | * | 8/1998 | Narahashi et al. | 370/480 |
| 6,522,869 B1 | * | 2/2003 | Hiramatsu et al. | 455/127.2 |
| 6,590,906 B1 | * | 7/2003 | Ishida et al. | 370/480 |

FOREIGN PATENT DOCUMENTS

| | | |
|---|---|---|
| JP | 6-30069 | 2/1994 |
| JP | 8-274734 | 10/1996 |
| JP | 11-205276 | 7/1999 |
| WO | WO 96/18249 | 6/1996 |

OTHER PUBLICATIONS

CDMA System and Advanced Mobile Communication System, Chapter 1 and partial translation: Chapter 1–4 and 1–5.3.3. (Jun. 1, 1996).

Copy of Office Action issued for Applicants' counterpart (priority) application JP 11–354,330 C, Reference No. 2022010191, dated Jul. 11, 2000 (Japanese language with English translation attached).

\* cited by examiner

*Primary Examiner*—Stephen Chin
*Assistant Examiner*—Sam K. Ahn
(74) *Attorney, Agent, or Firm*—Smith, Gambrell & Russell, LLP

(57) ABSTRACT

A multicarrier transmitting method that includes inputting n input signals, generating carriers corresponding to the n input signals, modulating the carriers into n modulated signals and generating at least one additional signal having a frequency outside band of the n modulated signals. The method also includes adjusting a level and a phase of the generated additional signal, outputting a multiplexed signal by adding up the n modulated signals and the adjusted additional signal, amplifying the multiplexed signal, and then removing the additional signal. The level and the phase of the additional signal are adjusted such that, after predicting a change of a composite vector of the n modulated signals based on an amplitude and a phase of the n carriers, a composite vector obtained after an adding operation can be lower than that before the adding operation when an absolute value of a prediction result exceeds a predetermined level.

10 Claims, 6 Drawing Sheets

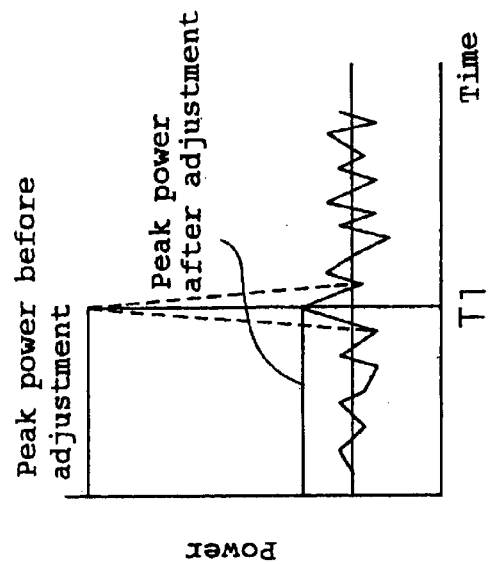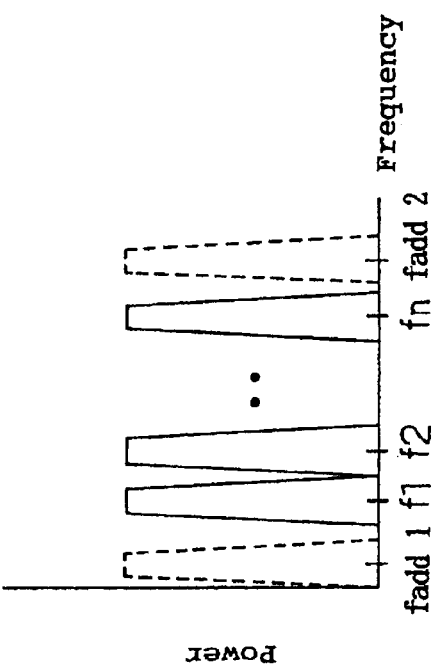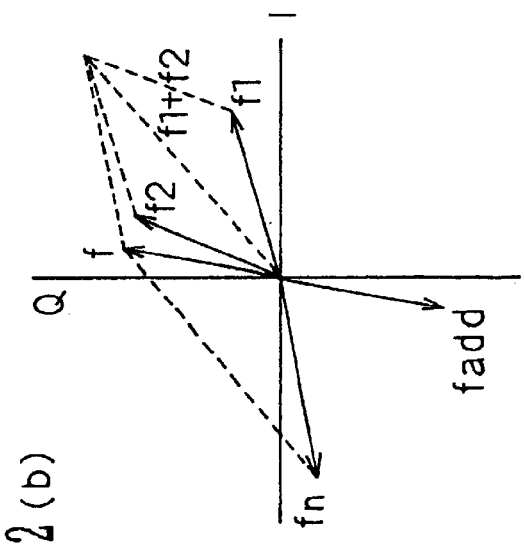

MULTICARRIER TRANSMITTING METHOD AND MULTICARRIER TRANSMITTER CIRCUIT

BACKGROUND OF THE INVENTION

1. Field of the Invention

The present invention mainly relates to a multicarrier transmitting method and its transmission circuit used for a cellular base station.

2. Related Art of the Invention

Recently, digital mobile communications have made remarkable progress, and the arrangement of the infrastructure including a base station is urgently required. Especially in large cities, a smaller base station is necessary for use in a difficult place for radio communications such as an area encompassed by large buildings, an underground street, etc. Thus, a smaller base station device replacing the conventional large base station device is requested.

The conventional multicarrier transmitter circuit will be described below by referring to FIG. 4. In FIG. 4 showing a block diagram of the conventional multicarrier transmitter circuit, an exchange 402 retrieves only a necessary signal from among signals for respective users transmitted by a public telephone network 401, and the signal is output to each of n channels. The n output signals are handled in an appropriate base band process such as a band limit filtering process by base band process circuits 403-1 to 403-n, modulated by modulators 404-1 to 404-n, and added up by an addition circuit 405 in an analog system. An output is amplified by a high frequency power amplification circuit 406, and is transmitted through an antenna 407.

FIG. 5 shows a conventional common multicarrier transmission signal. FIG. 5(a) shows the frequency spectrum of a common multicarrier transmission signal. FIGS. 5(b), 5(c), 5(d), and 5(e) shows the rotation of the vector of one carrier. FIG. 5(f) shows a case in which four carriers have 90-degree phases each other. FIG. 5(g) shows a case in which vectors of the carriers are composed. FIG. 5(h) shows a change of total power of a multicarrier transmission signal with time.

As shown in FIG. 5(a), each carrier is positioned with its frequency shifted from one another so that the central frequency f1, f2, . . . , fn cannot be superposed. The vector of one (f1) of the carriers is rotating counterclockwise from the stating point shown in FIG. 5(b). After ¼ period, it is rotated to the position shown FIG. 5(c). After ½ period, it is rotated to the position shown in FIG. 5(d). After ¾ period, it reaches the position shown in FIG. 5(e). After a period, it reaches the original point shown in FIG. 5(b). Since the central frequency of the carrier of a multicarrier is shifted little by little, the value obtained by composing each vector changes with time although they have an equal carrier amplitude.

Assuming that there are carriers f1 to fn having four different frequencies and an equal amplitude, and they are shifted by 90 degrees at a certain moment respectively as shown in FIG. 5(f), f1 and f3 have an equal value in the opposite directions, f2 and fn have an equal value in the opposite directions, and the composite vector reached nearly 0. If the four vectors are arranged in the same direction at a certain moment, the composite vector quadruples. For example, if there are three carriers, that is, f1, f2, and f3, as shown in FIG. 5(g), the composite vector is f which changes with time because respective angular speeds are different a little bit from one another. Therefore, the total power of the transmission signal changes with time, and a peak power at a level considerably higher than that of an average power is occasionally generated as shown in FIG. 5(b).

Furthermore, a present portable telephone in a Code Division Multiple Access (CDMA) system has been developed to replacing the current digital portable telephone by reserving a larger communications capacity. Since the CDMA is described in detail in 'CDMA System and New Generation Mobile Communications System (edited by Akira Ogawa, in a Trikeps series; Chapter 1 PP12–25; published by Trikeps Ltd.', the detailed explanation of the system will be omitted here. Since a base station of the digital portable telephone uses a linear modulation system, and a signal is transmitted along a plurality of carriers (multicarrier), a transmission and reception circuit requires strict linearity and a wide dynamic range.

FIG. 6 is a block diagram of the main part of a multicarrier transmission circuit in the conventional CDMA system. In FIG. 6, k×n channel signals retrieved from a public network through an exchange (not shown in the attached drawings) are input to channel input terminals 601-(1-1) to 601-(n-k), and multiplied respectively by code multipliers 602-(1-1) to 602-(n-k) using a code selected by a code selection circuit 607. The resultant k outputs are added up by using digital addition circuits 603-1 to 603-n, and obtains n outputs. Using the resultant n outputs, the n carriers generated by carrier generators 605-1 to 605-n are modulated by modulators 604-1-604-n. The resultant n outputs are added up in an analog system by an addition circuit 606, and a multicarrier signal is obtained at an output terminal 608. The signal is amplified by a high frequency power amplification circuit as shown in FIG. 4, and transmitted through an antenna. Especially, a transmission circuit has a circuit for handling high power such as a power amplification circuit, etc., and is designed to cover momentary maximum output (peak) power for average output power to maintain the linearity. Furthermore, since a high transmission rate is required to obtain a larger communications capacity, the bandwidth of a transmission signal ranges from several MHz to tens of GHz. Therefore, it is necessary to use a circuit operable with a signal which is variable by ¹⁄₁₀ microsecond.

However, when a ratio of momentary maximum output power to average output power (peak factor) becomes high, the transistor of a power amplification circuit also becomes large, thereby requiring average power obtained by considerably lowering the output level down from a saturated output power. In this manner with the level lowered, the ratio of the DC supply power of a power amplifier to the retrieved transmission power (power conversion efficiency) is deteriorated. Especially, in the CDMA system, the peak factor doubles more than the value in the conventional TDMA system. Furthermore, by multiplexing a code, which is a feature of the CDMA system, the peak factor becomes larger, and the peak factor of about 13 dB can be obtained at the maximum multiplexing operation. If it is furthermore multiplexed through a multicarrier, the peak factor becomes the larger as described above. Therefore, a transmission circuit such as a power multiplication circuit requires strict linearity as compared with the conventional system, and it is necessary to use an element capable of outputting power more than ten times the actual power. As a result, the transmission circuit is larger, and it is difficult to design a small base station.

To reduce a peak factor, a multicarrier transmitter circuit under feedback control as disclosed by the Japanese Patent Laid-Open No.8-274734 and No.8-818249 has been suggested. In these circuits, the signal fluctuation period is higher than tens of microseconds when a narrow band (several kHz to several hundreds of kHz) is transmitted, thereby successfully performing the process through the circuit. However, for a broad band signal of several MHz to tens of MHz, the circuit cannot follow the fluctuation period. Therefore, it is difficult to apply the transmittion the circuit used for a base station.

SUMMARY OF THE INVENTION

To solve the above mentioned problems of the conventional multicarrier transmitter circuit, the present invention aims at providing a multicarrier transmitting method and a multicarrier transmitter circuit for reducing momentary maximum output power to a small value for a broad band signal of several MHz to tens of MHz, and reducing a peak factor of a multicarrier transmission signal, thereby reducing the power of an electric amplifier, improving the power conversion efficiency, and realizing a smaller circuit.

The $1^{st}$ invention of the present invention is a multicarrier transmitting method, comprising the steps of:

inputting n (n is an integer equal to or larger than 2) input signals;

generating carriers respectively corresponding to the n input signals;

modulating the carriers into n modulated signals by the input signals;

generating at least one additional signal having a frequency outside a band of the n modulated signals;

adjusting a level and a phase of the generated additional signal;

outputting a multiplexed signal by adding up the n modulated signals and the adjusted additional signal; and amplifying the multiplexed signal, and then removing the additional signal, wherein said level and phase of the additional signal are adjusted such that, after predicting in advance a change of a composite vector of the n modulated signals based on an amplitude and a phase of the n carriers, a composite vector obtained after an adding operation can be lower than that before the adding operation when an absolute value of a prediction result exceeds a predetermined level.

The $2^{nd}$ invention of the present invention is the method according to $1^{st}$ invention, wherein:

a feed forward circuit is used as a high frequency power amplification means of amplifying the multiplexed signal; and said additional signal is a pilot signal generated by distortion adjusting pilot signal generation means of said feed forward circuit.

The $3^{rd}$ invention of the present invention is the method according to $1^{st}$ or $2^{nd}$ inventions, wherein said input signal is a signal in a code division multiple access system.

The $4^{th}$ invention of the present invention is the method according to any one of $1^{st}$ to $3^{rd}$ inventions, wherein said additional signal is outside a band of the n modulated signals by 5% of a width of the band.

The $5^{th}$ invention of the present invention is the method according to any one of $1^{st}$ to $3^{rd}$ inventions, wherein said additional signal exists outside the band of the n modulated signals both at lower and higher frequency side.

The $6^{th}$ invention of the present invention is a multicarrier transmitter circuit, comprising:

input terminals for inputting n (n is an integer equal to or larger than 2) input signals;

n carrier generation means of generating n carriers corresponding to the signals input to said n input terminals;

n modulation means, connected to an output terminal of each of said carrier generation means and each of said input terminals, for modulating the carriers by the each input signals and outputting n modulated signals;

additional signal generation means of generating at least one additional signal having a frequency outside a band of the n modulated signals;

at least one variable means of adjusting a level and a phase of the additional signal generated by said additional signal generation means;

control means of controlling said variable means based on the phase and the level of each of said n carriers;

addition means of connecting an output terminal of said n modulation means to an output terminal of said variable means, and outputting a multiplexed signal by adding up the n modulated signals and the adjusted additional signal;

power amplification means of amplifying the multiplexed signal multiplexed by said addition means; and filter means, connected to an output terminal of said power amplification means, for suppressing the additional signal from the output terminal of said power amplification means, wherein said control means controls a level and a phase of the additional signal by using said variable means such that, after predicting in advance a change of a composite vector of the n modulated signals based on a phase and a level of each of the n carriers, a composite vector obtained after an adding operation can be lower than that before the adding operation when an absolute value of a prediction result exceeds a predetermined level.

The $7^{th}$ invention of the present invention is the circuit according to $6^{th}$ invention, wherein:

said power amplification means comprises a feed forward circuit;

said additional signal generation means can be a distortion adjusting pilot signal generation means of said feed forward circuit; and said additional signal is the distortion adjusting pilot signal.

The $8^{th}$ invention of the present invention is the circuit according to $6^{th}$ or $7^{th}$ inventions, further comprising:

m (m (=k×n) is an integer equal to or larger than n) code modulation means of modulating m preprocessing input signals into m preprocessing modulated signals by corresponding codes respectively;

code selection means of selecting the code for each of the preprocessing input signals; and n preprocessing addition means of generating the n input signals by adding the m preprocessing modulated signals for k signals, wherein n outputs of said preprocessing addition means are input signals to said input terminal.

The $9^{th}$ invention of the present invention is the circuit according to any one of $6^{th}$ to $8^{th}$ inventions, wherein said additional signal is outside a band of the n modulated signals by 5% of a width of the band.

The $10^{th}$ invention of the present invention is a the circuit according to any of $6^{th}$ to $8^{th}$ inventions, wherein said additional signal exists outside the band of the n modulated signals both at lower and higher frequency side.

With the above mentioned method and configuration according to the present invention, the phase of each carrier of a multicarrier at a certain time point is fetched and if it is predicted, based on the phase and the frequency of each carrier, that an absolute value of a composite vector generated by a transition of the phase relation between carriers exceeds a predetermined value, then the phase and the intensity of an additional signal or a pilot signal are controlled in the direction of reducing the total vector at the time point, to reduce the absolute value of the total vector processed by a high frequency power amplifier, and thereby the apparent transient power is lowered, thereby lowering the peak factor. Thus, the required power of the power amplifier can be smaller, and the power conversion efficiency can be improved, thereby realizing a smaller circuit.

BRIEF DESCRIPTION OF THE DRAWINGS

FIGS. 2(a)–2(c) are views for explaining a multicarrier transmission signal according to the first embodiment of the present invention;

Figure 1:
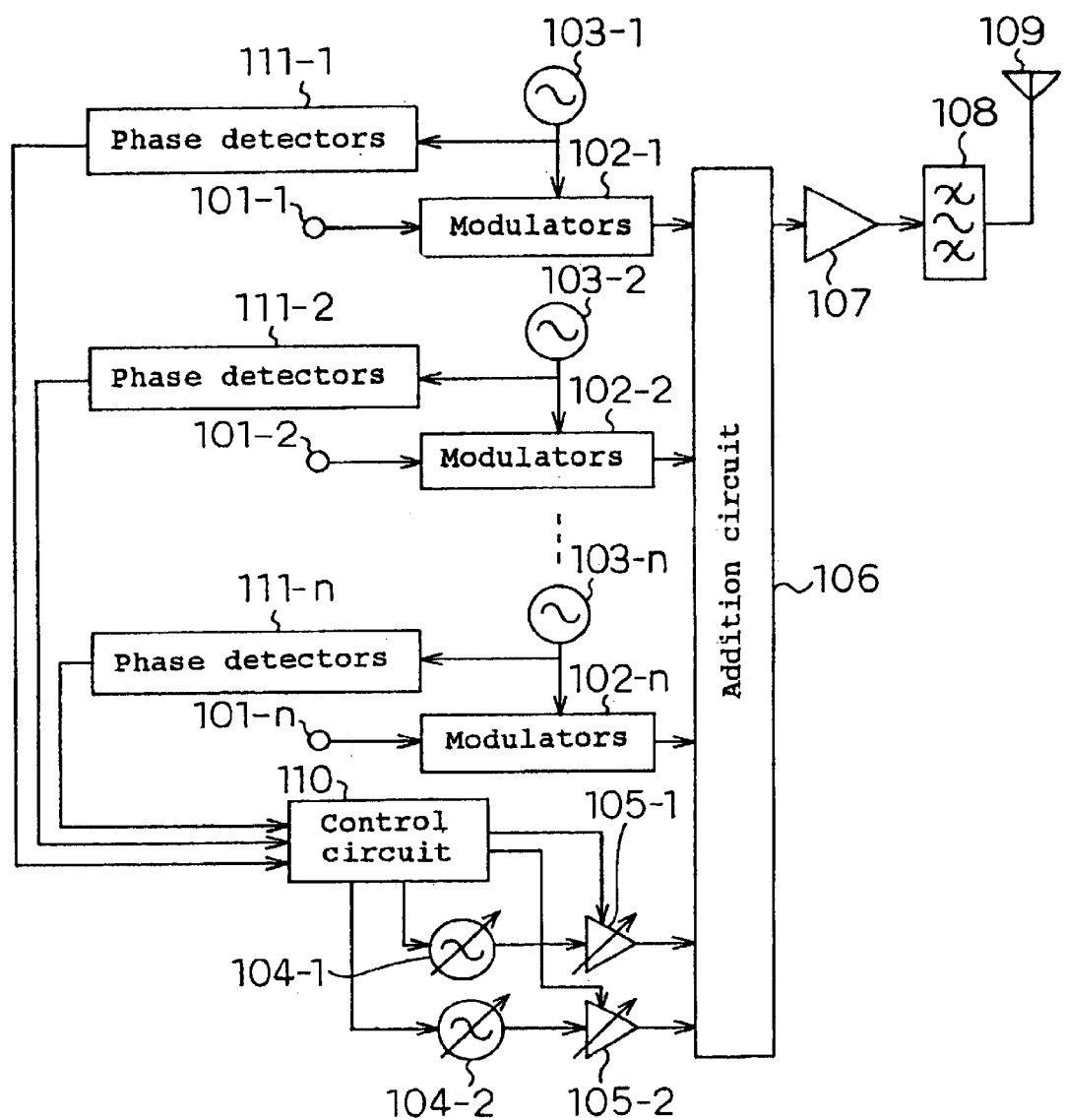
FIG. 1 is a block diagram of a multicarrier transmitter circuit according to a first embodiment of the present invention.

DESCRIPTION OF SYMBOLS 102-1 to 102-n Modulators
103-1 to 103-n Carrier generators
104-1 and 104-2 Additional signal generators
105-1 and 105-2 Variable attenuators
106 Addition circuit
107 High frequency amplifier
108 Band pass filter
110 Control circuit
111-1 to 111-n Phase detectors
301 Input terminal
302 Power distributor
303 Vector adjuster
304 Main amplifier
305 Distortion detecting power composition unit
306 Delay circuit
307 Delay circuit
308 Distortion removing power composition unit
309 Vector adjuster
310 Auxiliary amplifier
311 Output terminal
312 Pilot signal generation circuit
313 Variable level/variable phase circuit
314 Pilot signal detection circuit

PREFERRED EMBODIMENTS OF THE INVENTION

Embodiment 1

An embodiment 1 according to the present invention will be described below by referring to the attached drawings. FIG. 1 is a block diagram showing an embodiment of the multicarrier transmitter circuit according to the present invention. FIG. 2 shows a multicarrier transmission signal according to the present invention. In FIG. 1, n input signals input to input terminals 101-1 to 101-n of input signals are input to modulators 102-1 to 102-n, and carriers generated by corresponding carrier generators 103-1 to 103-n are modulated by n input signals. The frequencies of the carriers of the carrier generators 103-1 to 103-n are separate by a predetermined frequency from each other, and are not superposed by each other as shown in FIG. 2(a). All frequencies are contained in a predetermined band. On the other hand, additional signal generators 104-1 and 104-2 capable of changing the phase of an output signal generate an additional signal at a frequency outside a predetermined band of the frequency of the carrier. For example, an output of the additional signal generator 104-1 has a frequency of fadd 1 lower than the lower limit of the above mentioned predetermined band, and an output of the additional signal generator 104-2 has a frequency of fadd 2 higher than the upper limit of the above mentioned predetermined band. The outputs of the additional signal generators 104-1 and 104-2 are output through variable attenuators 105-1 and 105-2.

The output of each of the modulators 102-1 to 102-n and the outputs of the variable attenuators 105-1 and 105-2 are input to an addition circuit 106, respectively added, multiplexed, and output. The output is power amplified by a power amplifier 107. Only the frequency band of the carrier of the carrier generators 103-1 to 103-n passes through a band pass filter 108, that is, the range of the frequency of the additional signal generators 104-1 and 104-2 is deleted and output.

The operation of a control circuit 110 will be described below. The phase of each of the carrier generators 103-1, 103-2, and 103-n is detected by phase detectors 111-1, 111-2, and 111-n, and a detection result is input to the control circuit 110. Each of the phases is detected in advance in, for example, a warm-up period before actual transmission. The phase relation at a certain time point can be predicted according to the explanation of the conventional technology by referring to FIG. 5 in which all carriers have vectors rotating at respective angular speed, the rotation is different a little bit from one another depending on the frequency of each carrier, the phase relation from each other varies with the lapse of time from the time point of t0 at which the phase detection starts, and therefore if the frequency of each carrier is known, the phase relation at any time point is predictable. The control circuit 110 predicts the phase relation of each carrier with the lapse of time from the time t0 according to the phase information about each detected carrier and the frequency of each carrier, and determines the attenuation level of the variable attenuators 105-1 and 105-2 such that the phase of the additional signal generated by the additional signal generators 104-1 and 104-2 has a vector in the opposite direction of the total vector depending on the level of the concentration of the vectors, and the absolute value can reach the value of the total vector.

That is, in FIG. 2(b), if there exist only the carriers f1, f2, and fn, the composite value f obtained by composing the composite value of f1+f2 and fn is output from the power amplifier 107. But an additional signal having the phase of fadd is generated from the additional signal generator 104-1 or the additional signal generator 104-2, and the additional signal is adjusted by the variable attenuator 105-1 or 105-2 to be added to the signals of f by the addition circuit 106. In such a simple case as described above, only one additional signal can be used. However, when vectors are complicatedly combined or the value of a composite vector is large, two additional signals must be used respectively. By adding additional signals, a peak generated as indicated by the broken line as shown in FIG. 2(*c*) is suppressed as indicated by the solid line. Thus, the peak factor of the power passing through the power amplifier 107 is improved, thereby reducing the power processed by the power amplifier 107. Then, only the power can pass through the transmission band using the band pass filter 108, and can be transmitted through an antenna 109 after removing the additional signal.

According to the present embodiment, in this manner an additional signal is generated outside the band of a multicarrier for transmission, the phase of each carrier of a multicarrier is rotated, and the level of the concentration of signal vectors caused by the phase rotation is predicted, and the phase and the level of an additional signal are adjusted based on the prediction, thereby offsetting the total vector of a signal to be transmitted, and the component of the additional signal is removed for transmission by a filter after amplifying the power. Thus, the peak power in the power amplifier is to be suppressed. As a result, the amplification element of the power amplifier can be reduced, thereby improving the power conversion efficiency.

As described above, two additional signals are used in this example. However, it is obvious that only one additional signal can be used, or a plurality of signals can be added outside a transmission band.

In addition, the same effect can be obtained by a variable amplifier replacing a variable attenuator.

In addition, it is not necessary that the signal level of a carrier equal to that of the carrier used for a target transmission signal.

Furthermore, the carrier modulated for transmission of a target signal can be different in the format of a signal from such as modulation type the additional signal.

Embodiment 2

Figure 3:
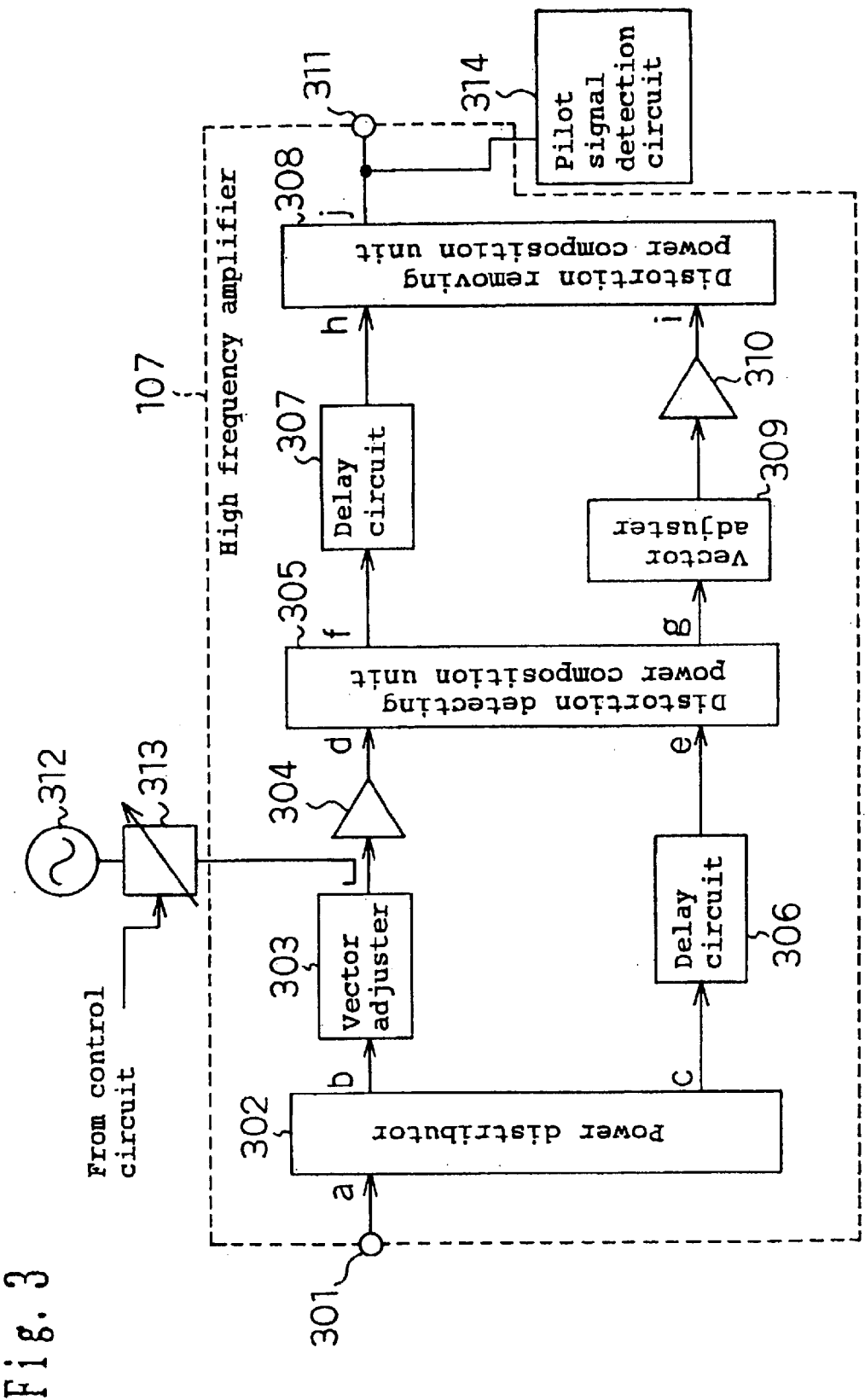
FIG. 3 is a block diagram of the central portion according to a second embodiment of the present invention.
Figure 4:
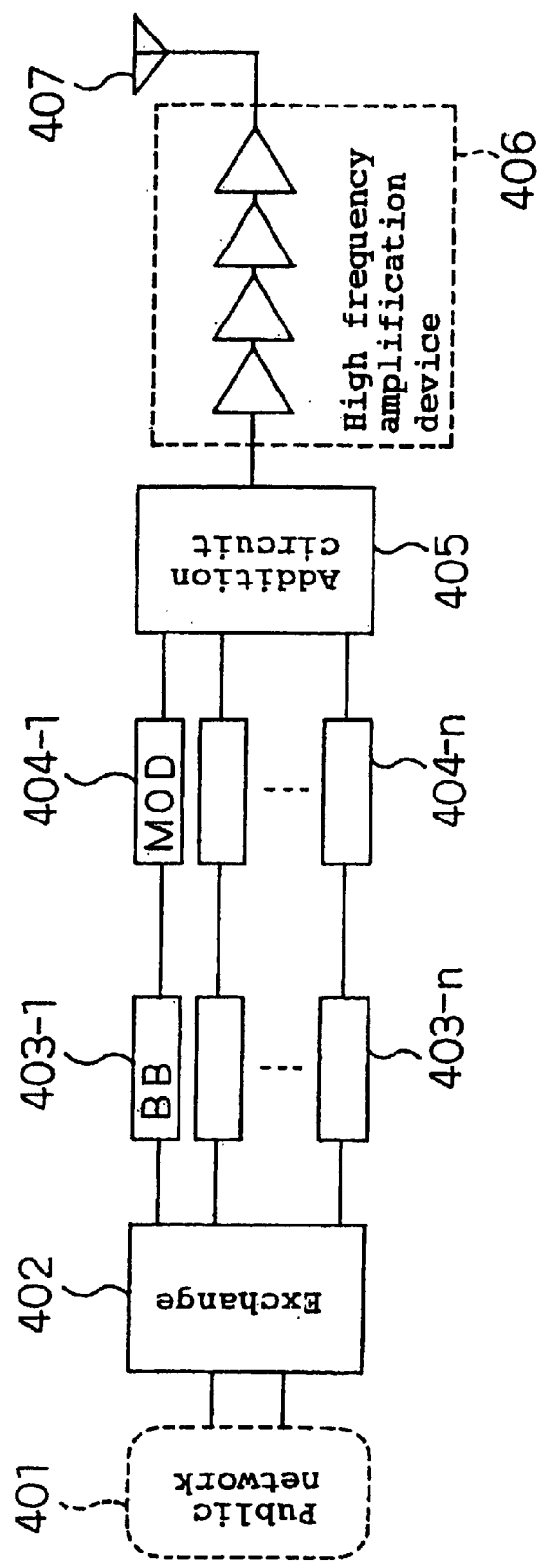
FIG. 4 is a block diagram of a conventional multicarrier transmission signal.
Figure 5A:
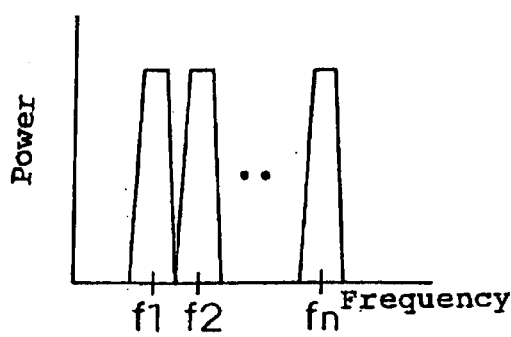
FIGS. 5(a)–5(h) are views for explaining the conventional common multicarrier transmission signal.
Figure 5B:
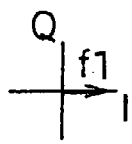
Figure 5C:
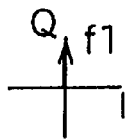
Figure 5D:
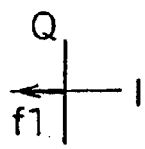
Figure 5E:
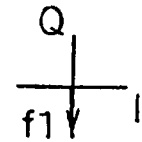
Figure 5F:
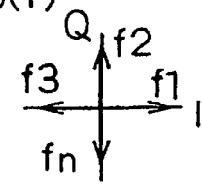
Figure 5G:
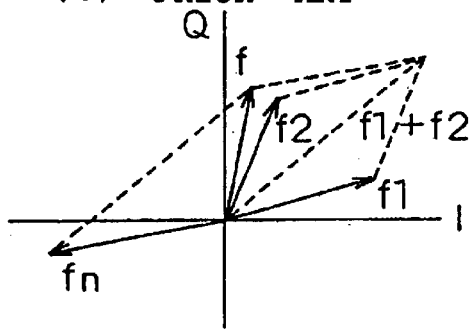
Figure 5H:
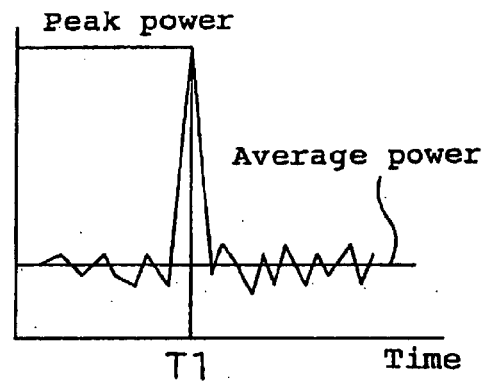

FIG. 3 is a block diagram of the central portion of the high frequency power amplification circuit of the multicarrier transmitter circuit according to a second embodiment of the present invention. In FIG. 3, the high frequency amplifier 107 shown in FIG. 1 is configured by a feed forward circuit containing pilot signal generation means. An input terminal 301 is connected to a port a of a is connected to a port a of a power distributor 302, and is connected from a port b of the power distributor 302 to a main amplifier 304 for amplifying the power of the input signal through a vector adjuster 303. An output of the main amplifier 304 is connected to a port d of a distortion detecting power composition unit 305. A port C of the power distributor 302 is connected to a port e of the distortion detecting power composition unit 305 through a delay circuit 306.

A port f of the distortion detecting power composition unit 305 is connected to a port h of a distortion removing power composition unit 308 through a delay circuit 307. In addition, a port g of the distortion detecting power composition unit 305 is connected to a port i of the distortion removing power composition unit 308 through a vector adjuster 309 and an auxiliary amplifier 310 connected in series. A port j of the distortion removing power composition unit 308 is connected to an output terminal 311.

In addition, a pilot signal generation circuit 312 is designed to generate a frequency immediately above or below outside the frequency band to be amplified by the high frequency amplifier 107. The output is input to a variable level/variable phase circuit 313, which adjusts the phase and the level of the output, and applies it to the input terminal of the main amplifier 304. And a pilot signal level detection circuit for extracting only the frequency element of a pilot signal and checking the level is connected to the output terminal 311.

Described below will be the operation of the feed forward circuit configured as described above. First, an input signal containing a multichannel element input from the input terminal 301 is distributed into two outputs by the power distributor 302. The phase and the amplitude of one of the two distributed output signals are adjusted by the vector adjuster 303 at the port b, and the signal is amplified by the main amplifier 304, and is input to the port d of the distortion detecting power composition unit 305. At this time, a signal containing the distortion element by mutual modulation among multichannel signals in addition to the input signal element is input on account of the nonlinearity of the main amplifier 304. The other signal of the two distributed signals is delayed by the delay circuit 306, and input from the port C to the port e of the distortion detecting power composition unit 305.

By adjusting the vector adjuster 303 comprising a variable attenuator and a variable phase shifter and the delay circuit 306 such that an input signal element of a signal input to the ports d and e can have an equal amplitude and reaches an inverse phase, a signal containing only a distortion element with the input signal element offset is output from the port g, and a signal element input from the port e is output from the port f.

Then, the signal containing the input signal element and the distortion element output from the port f is delayed by the delay circuit 307, and input to the port h of the distortion removing power composition unit 308. The signal containing the distortion element output from the port g is amplified by the auxiliary amplifier 310 through the vector adjuster 309, and input to the port i of the distortion removing power composition unit 308. By adjusting the vector adjuster 309 and the delay circuit 307 such that the distortion elements of the signal input to the ports h and i can be equal to each other in amplitude and opposite in phase, the signal containing only the input signal element is output from the port j to the output terminal 311 with the distortion element offset.

The role of the pilot signal applied to the main amplifier 304 from the pilot signal generation circuit 312 through the variable level/variable phase circuit 313 is recognized by the circuit as the distortion generated in the main amplifier 304 because the signal is not input from the input terminal 301. By inputting such a pseudo-distortion signal, monitoring the output after the distortion cancellation loop by a pilot signal detection circuit 314, and adjusting the delay circuit 307 and the vector adjuster 309 of the distortion cancellation loop such that the level of the extracted pilot signal element can be minimized, the generation of the distortion can be minimized.

According to the present embodiment, a pilot signal used for detection for reduction of the distortion generated in the high frequency amplifier exists immediately outside the band of a normally amplified signal, and therefore can be used as the additional signal. In this example, the word of "immediately outside" means that the signal is outside the band by 5% of the width of the band of n modulated signals.

When the circuit shown in FIG. 1 is combined with that shown in FIG. 1, the additional signal generators 104-1 and 104-2 and the variable attenuators 105-1 and 105-2 shown in FIG. 1 are not required, and instead of it the control of the control circuit 110 is applied to the variable level/variable phase circuit 313. The variable level/variable phase circuit 313 controls the output of the pilot signal generation circuit such that it can indicate a necessary level as a pilot signal. When it is necessary to generate an additional signal, the control circuit 110 controls the signal from the pilot signal generation circuit such that a necessary phase and a necessary level of an additional signal can be obtained.

Thus, according to the present embodiment, a pilot signal to be applied for detection to the feed forward circuit to improve the distortion of the power amplifier is utilized. That is, the pilot signal has the function of an additional signal. Thus, When an additional signal is required, the phase and the level of a pilot signal are controlled to use the signal as a substitute for the additional signal, thereby omitting the additional signal generation circuit.

Embodiment 3

Figure 6:
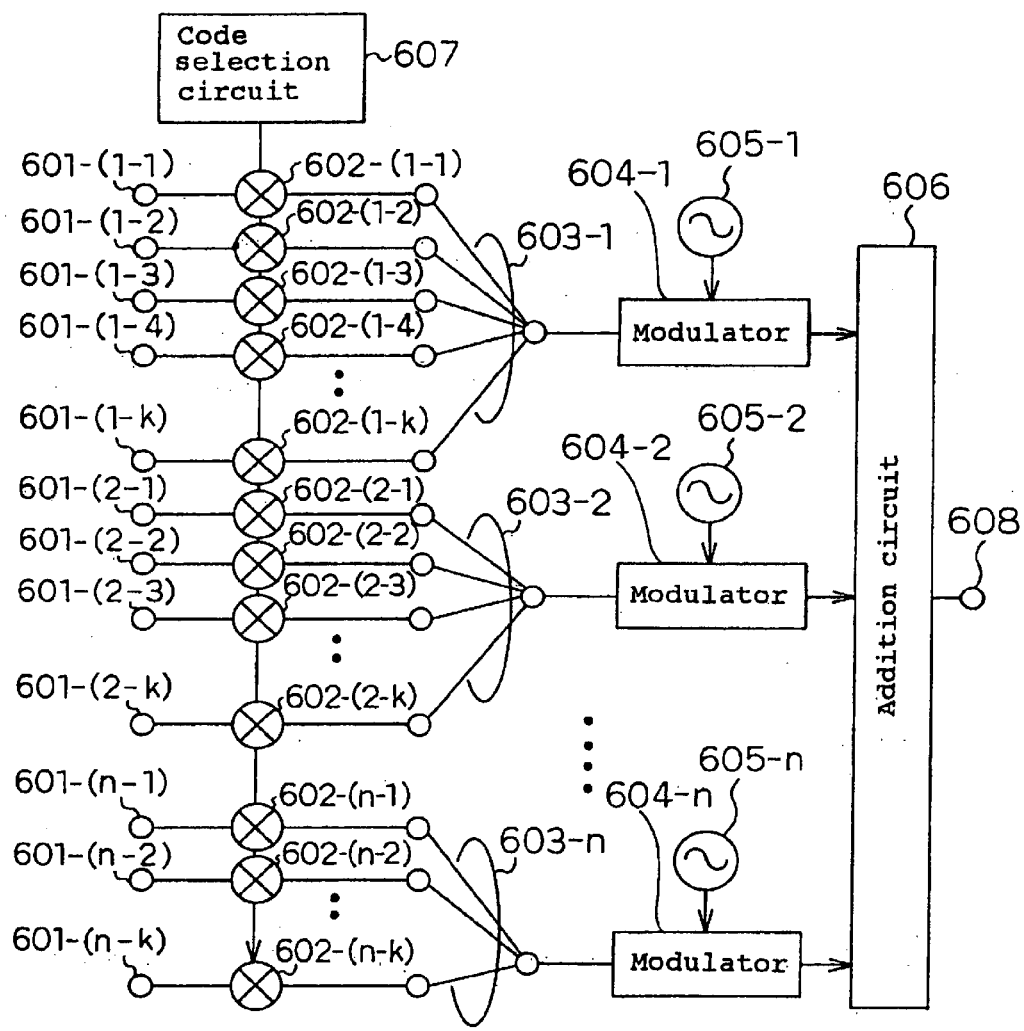
FIG. 6 is a block diagram of a main portion of the multicarrier transmitter circuit in the CDMA system referred to in the explanation of the conventional technology and a third embodiment of the present invention.

A third embodiment of the present invention will be described below by referring to the attached drawings. The present invention can also be used in the CDMA system as shown in FIG. 6 showing the conventional system. If n outputs of the digital addition circuits 603-1 to 603-$n$ shown in FIG. 6 also explained in the conventional embodiment are input to the input terminals 101-1 to 101-$n$ shown in FIG. 1, then the operation similar to the explanation in respect to the FIG. 1 can be performed. In FIG. 6, k×n (=m) channel signals retrieved through the exchange from the public network (not shown in the drawing)are input to the channel input terminals 601-(1-1) to 601-($n$-$k$), and are multiplied by the code multipliers 602-(1-1) to 602- ($n$-$k$) using the code selected by the code selection circuit 607. The k outputs are added to one by the digital addition circuits 603-1 to 603-$n$, and n outputs are obtained. The n outputs are added to the input terminals 101-1 to 101-$n$ shown in FIG. 1, the n carriers generated by the carrier generators 103-1 to 103-$n$ are modulated by the modulators 102-1 to 102-$n$, the modulated n carriers are added together with the additional signals from the additional signal generators 104-1 and 104-2 by the addition circuit 106 in an analog adding operation, a multicarrier signal is obtained the multicarrier signal is amplified by the high frequency power amplification circuit 107. Or, in the case according to the second embodiment, the modulated carrier signals are amplified by the high frequency power amplifier 107, with added of the pilot signal instead of the additional signal from the additional signal generation circuit, and then a the additional signal component or a pilot signal component is removed by the Band pass filter 108, to be transmitted from the antenna 109. The detailed operation after the digital addition is the same as the operation according to the embodiments 1 and 2.

As described above, according to the present embodiment, the peak factor which is normally large especially in the CDMA system can be reduced by adding an additional signal or a pilot signal with the phase and the level to reduce the power before the power processed by a high frequency power amplifier increases with a composite vector of a multicarrier signal, thereby reducing the power of the power amplifier, improving the power conversion efficiency, and minimizing a circuit.

As described above, according to the multicarrier transmitting method and the multicarrier transmitter circuit of the present invention, the absolute value of a total vector applied to a power amplifier can be reduced, the instantaneous peak power can be reduced for a smaller peak factor, the power of the power amplifier can be reduced, the power conversion efficiency can be improved, and a smaller circuit can be designed.

What is claimed is:

1. A multicarrier transmitting method, comprising the steps of:

inputting n input signals, wherein n is an integer equal to or larger than 2;

generating n carriers respectively corresponding to the n input signals;

modulating the n carriers into n modulated signals by the n input signals;

generating at least one additional signal having a frequency outside a band of the n modulated signals;

adjusting a level and a phase of the generated additional signal;

outputting a multiplexed signal by adding up the n modulated signals and the adjusted additional signal; and amplifying the multiplexed signal, and then removing the generated additional signal, wherein said level and said phase of the generated additional signal are adjusted such that, after predicting in advance a change of a composite vector of the n modulated signals based on an amplitude and a phase of the n carriers, the composite vector obtained after said up operation can be lower than the composite vector brfore said up when an absolute value of a prediction result exceeds a predetermined level.

2. The method according to claim 1, wherein:

a feed forward circuit is used as a high frequency power amplification means of amplifying the multiplexed signal; and said generated additional signal is a pilot signal generated by distortion adjusting pilot signal generation means of said feed forward circuit.

3. The method according to claim 1 or 2, wherein said n input signals are signals in a code division multiple access system.

4. The method according to claim 1 or 2, wherein said generated additional signal is outside the band of the n modulated signals by 5% of a width of the band.

5. The method according to claim 1 or 2, wherein said generated additional signal exists outside the band of the n modulated signals both at lower and higher frequency sides.

6. A multicarrier transmitter circuit, comprising:

input terminals for inputting n input signals, wherein n is an integer equal to or larger than 2 n carrier generation means of generating n carriers corresponding to the n input signals input to said n input terminals;

n modulation means, connected to an output terminal of each of said n carriers generation means and each of said n input terminals, for modulating the n carriers by each of said n input signals and outputting n modulated signals;

additional signal generation means of generating at least one additional signal having a frequency outside a band of the n modulated signals;

at least one variable means of adjusting a level and a phase of the at least one additional signal generated by said additional signal generation means;

control means of controlling said at least one variable means based on the phase and the level of each of said n carriers;

addition means of connecting an output terminal of said n modulation means and an output terminal of said at least one variable means, and outputting a multiplexed signal by adding up the n modulated signals and the adjusted additional signal;

power amplification means of amplifying the multiplexed signal multiplexed by said addition means; and filter means, connected to an output terminal of said power amplification means, for suppressing the at least one additional signal from the output terminal of said power amplification means, wherein said control means controls a level and a phase of the at least one additional signal by using said at least one variable means such that, after predicting in advance a change of a composite vector of the n modulated signals based on a phase and a level of each of the n carriers, the composite vector obtained after said adding up by said addition means can be lower than the composite vector before said up when an absolute value of a prediction result exceeds a predetermined level.

7. The circuit according to claim 6, wherein:

said power amplification means comprises a feed forward circuit;

said additional signal generation means can be a distortion adjusting pilot signal generation means of said feed forward circuit; and said additional signal is a distortion adjusting pilot signal.

8. The circuit according to claim 6 or 7, further comprising:

m code modulation means of modulating m preprocessing input signals into m preprocessing modulated signals by corresponding codes respectively, wherein m is an integer equal to or larger than n;

code selection means of selecting the code for each of the preprocessing input signals; and n preprocessing addition means of generating the n input signals by adding the m preprocessing modulated signals for k signals, wherein n outputs of said preprocessing addition means are input signals to said n input terminals, wherein m=k×n.

9. The circuit according to claim 6 or 7, wherein said additional signal is outside the band of the n modulated signals by 5% of a width of the band.

10. The circuit according to claim 6 or 7, wherein said additional signal exists outside the band of the n modulate signals both at lower and higher frequency sides.

* * * * *

UNITED STATES PATENT AND TRADEMARK OFFICE
CERTIFICATE OF CORRECTION

PATENT NO. : 6,813,317 B2  
DATED : November 2, 2004  
INVENTOR(S) : Kaoru Ishida et al.

It is certified that error appears in the above-identified patent and that said Letters Patent is hereby corrected as shown below:

Column 10,  
Lines 26 and 27, please correct as follows:  
-- the composite vector obtained after said adding up can be lower than the composite vector before said adding up when --.  
Line 48, insert -- n -- before "input terminals".  
Line 49, insert -- ; -- "larger than 2".

Column 11,  
Line 21, insert -- adding -- after "vector before said".

Column 12,  
Line 16, insert -- and -- after "terminals,".  
Line 23, insert -- modulated -- for "modulate".

Signed and Sealed this

Eleventh Day of October, 2005

JON W. DUDAS  
*Director of the United States Patent and Trademark Office*

UNITED STATES PATENT AND TRADEMARK OFFICE
CERTIFICATE OF CORRECTION

PATENT NO. : 6,813,317 B2  Page 1 of 1
APPLICATION NO. : 09/732913
DATED : November 2, 2004
INVENTOR(S) : Kaoru Ishida et al.

It is certified that error appears in the above-identified patent and that said Letters Patent is hereby corrected as shown below:

Column 10,
Lines 26 and 27, please correct as follows:
-- the composite vector obtained after said adding up can be lower than the composite vector before said adding up when --.
Line 48, insert -- n -- before "input terminals".
Line 49, insert -- ; -- after "larger than 2".

Column 11,
Line 21, insert -- adding -- after "vector before said".

Column 12,
Line 16, insert -- and -- after "terminals,".
Line 23, insert -- modulated -- for "modulate".

This certificate supersedes Certificate of Correction issued October 11, 2005.

Signed and Sealed this

Twenty-first Day of November, 2006

JON W. DUDAS
*Director of the United States Patent and Trademark Office*